(12) United States Patent
Jiang et al.

(10) Patent No.: US 11,924,826 B2
(45) Date of Patent: Mar. 5, 2024

(54) FLEXIBLE TRANSMISSION UNIT AND ACKNOWLEDGMENT FEEDBACK TIMELINE FOR EFFICIENT LOW LATENCY COMMUNICATION

(71) Applicant: QUALCOMM Incorporated, San Diego, CA (US)

(72) Inventors: Jing Jiang, San Diego, CA (US); Tao Luo, San Diego, CA (US); Tingfang Ji, San Diego, CA (US); Peter Pui Lok Ang, San Diego, CA (US); Joseph Binamira Soriaga, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 15/373,427

(22) Filed: Dec. 8, 2016

(65) Prior Publication Data
US 2017/0171879 A1 Jun. 15, 2017

Related U.S. Application Data

(60) Provisional application No. 62/265,944, filed on Dec. 10, 2015.

(51) Int. Cl.
*H04W 72/1273* (2023.01)
*H04J 3/16* (2006.01)
(Continued)

(52) U.S. Cl.
CPC ....... *H04W 72/1273* (2013.01); *H04J 3/1694* (2013.01); *H04L 1/1607* (2013.01);
(Continued)

(58) Field of Classification Search
CPC .... H04J 3/1694; H04L 1/1887; H04L 5/0055; H04L 5/14; H04L 1/008; H04L 1/1607;
(Continued)

(56) References Cited

U.S. PATENT DOCUMENTS

| 2005/0259613 A1 | 11/2005 | Garudadri et al. |
| 2009/0103500 A1 | 4/2009 | Malkamaki et al. |

(Continued)

FOREIGN PATENT DOCUMENTS

| CN | 102257751 A | 11/2011 |
| CN | 102938693 A | 2/2013 |

(Continued)

OTHER PUBLICATIONS

Thakare, Ernström, Tsai. "An Evolved Frame Structure and the use of fractional OFDMA symbols", Jan. 23, 2008. IEEE S802. 16m-08_095r2. Slides 1-15.*

(Continued)

*Primary Examiner* — Oussama Roudani
(74) *Attorney, Agent, or Firm* — Patterson+ Sheridan, L.L.P.

(57) ABSTRACT

Certain aspects relate to methods and apparatus for a flexible transmission unit and acknowledgement feedback timeline for low-latency communication. As described herein, a UE may receive, within a subframe a first portion of a downlink control region scheduling at least a first data unit, wherein the subframe comprises at least two TTIs and wherein the subframe comprises the downlink control region, a data region, and an uplink control region, receive the first data unit in a first TTI of the data region, receive a second data unit in a second TTI of the data region, and separately acknowledge receipt of the first and second data units. According to aspects, the acknowledgment for the first data unit may occur in the same subframe as the transmission of (Continued)

the first data unit. A BS may perform corresponding operations.

21 Claims, 11 Drawing Sheets

(51) Int. Cl.
| | |
|---|---|
| H04L 1/00 | (2006.01) |
| H04L 1/1607 | (2023.01) |
| H04L 1/1829 | (2023.01) |
| H04L 1/1867 | (2023.01) |
| H04L 5/00 | (2006.01) |
| H04L 5/14 | (2006.01) |
| H04W 72/21 | (2023.01) |

(52) U.S. Cl.
CPC .......... *H04L 1/1854* (2013.01); *H04L 1/1887* (2013.01); *H04L 5/0055* (2013.01); *H04W 72/21* (2023.01); *H04L 1/008* (2013.01); *H04L 5/14* (2013.01)

(58) Field of Classification Search
CPC ............ H04L 1/1854; H04W 72/0413; H04W 72/1273
See application file for complete search history.

(56) References Cited

U.S. PATENT DOCUMENTS

| | | | | |
|---|---|---|---|---|
| 2009/0175372 A1* | 7/2009 | Moon | ................ | H04L 27/2602 375/260 |
| 2009/0201838 A1* | 8/2009 | Zhang | ................ | H04B 7/2656 370/280 |
| 2011/0255489 A1 | 10/2011 | Zhang et al. | | |
| 2012/0207109 A1 | 8/2012 | Pajukoski et al. | | |
| 2013/0016692 A1 | 1/2013 | Chen et al. | | |
| 2013/0100888 A1* | 4/2013 | Shimezawa | ........... | H04L 5/0053 370/328 |
| 2013/0294411 A1* | 11/2013 | Tsai | ...................... | H04W 72/04 370/331 |
| 2013/0336299 A1* | 12/2013 | Lee | ....................... | H04L 5/0055 370/336 |
| 2014/0056278 A1* | 2/2014 | Mariner | ............. | H04W 72/044 370/330 |
| 2015/0245329 A1* | 8/2015 | Pan | ......................... | H04L 5/001 370/329 |
| 2016/0020891 A1* | 1/2016 | Jung | ................. | H04W 72/0446 370/280 |
| 2016/0095093 A1* | 3/2016 | Yi | ........................... | H04L 5/001 370/280 |
| 2016/0353443 A1* | 12/2016 | Desai | ..................... | H04L 69/22 |
| 2017/0041103 A1* | 2/2017 | Määttanen | ............. | H04L 5/005 |
| 2017/0303250 A1* | 10/2017 | Shao | ................... | H04W 72/042 |
| 2017/0331547 A1* | 11/2017 | Kim | ...................... | H04L 5/0012 |
| 2017/0367058 A1* | 12/2017 | Pelletier | .............. | H04W 52/246 |
| 2018/0098337 A1* | 4/2018 | Lee | ..................... | H04W 72/042 |
| 2018/0123769 A1* | 5/2018 | Pelletier | ................ | H04L 5/0094 |
| 2018/0343047 A1* | 11/2018 | He | ....................... | H04B 7/0645 |
| 2020/0053731 A1* | 2/2020 | Ko | ..................... | H04W 72/0446 |
| 2020/0260527 A1* | 8/2020 | Xiong | ................... | H04L 5/0073 |
| 2021/0281378 A1* | 9/2021 | Park | ....................... | H04L 1/1887 |

FOREIGN PATENT DOCUMENTS

| | | |
|---|---|---|
| CN | 105144609 A | 12/2015 |
| CN | 107615696 A | 1/2018 |
| JP | 2011501898 A | 1/2011 |
| JP | 2011507334 A | 3/2011 |
| WO | 2013177774 A1 | 12/2013 |

OTHER PUBLICATIONS

International Search Report and Written Opinion—PCT/US2016/065805—ISA/EPO—dated Mar. 24, 2017.
Alcatel-Lucent Shanghai Bell et al., "Overview of Specification Impact for TTI Shortening," 3GPP Draft; R1-156721 Overview of Specification Impact for TTI Shortening Final, 3rd Generation Partnership Project (3GPP), Mobile Competence Centre ; 650, Route Des Lucioles ; F-06921 Sophia-Antipolis vol. RAN WG1. no. Anaheim. US; Nov. 15, 2014-Nov. 22, 2015 Nov. 15, 2015 (Nov. 15, 2015). XP051003102. Retrieved from the Internet: URL:http://www.3gpp.org/ftp/Meetings_3GPP_SYNC/RAN1/Docs/ - - [retrieved on Nov. 15, 2015], 3 pages.
CATT., "System Analysis on TTI Shortening," Document for Discussion and Decision, 3GPP TSg RAN WG1 #83, Anaheim, CA, USA, Nov. 15-22, 2015, R1-156613, pp. 1-8, XP051039895, Retrieved from the Internet: URL: http://www.3gpp.org/ftp/MeetingsSYNC/RAN1/Docs/ [retrieved on Nov. 15, 2015].
Chakchai So-In., et al., "Resource Allocation in IEEE 802.16 Mobile WiMAX", Apr. 30, 2010 (Apr. 30, 2010). XP055544818, ISBN: 978-1-4200-8824-3, 48 Pages, Retrieved from the Internet:URL:https://www.cse.wustl.edu/-jain/books/ftp/wimax_ra.pdf [retrieved on Jan. 18, 2019], Figure 4, pp. 6,7.
ETRI: "Discussion on TTI Shortening", 3GPP Draft, 3GPP TSG RAN WG1 Meeting #83, R1-157110, 3rd Generation Partnership Project (3GPP), Mobile Competence Centre, 650, Route Des Lucioles, F-06921, Sophia-Antipolis Cedex, France, vol. RAN WG1, No. Anaheim, USA, Nov. 16, 2015-Nov. 20, 2015, Nov. 15, 2015, XP051040006, 7 Pages, Retrieved from the Internet: URL: https://www.3gpp.org/ftp/tsg_ran/WG1_RL1/TSGR1_83/Docs/R1-157110.zip.
European Search Report—EP19151639—Search Authority—The Hague—dated May 6, 2019.
European Search Report—EP21184560—Search Authority—The Hague—dated Oct. 5, 2021.
Huawei, et al., "Control Signaling Enhancements for Short TTI", 3GPP Draft, 3GPP TSG-RAN WG1#83, R1-156461, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051002921, 6 Pages, Nov. 7, 2015 (Nov. 7, 2015), Sections 2-3, Retrieved from the Internet: URL: http://www.3gpp.org/ftp/tsg_ran/WG1_RL1/TSGR1_83/Docs/R1-156461.zip.
NTT DOCOMO INC: "5G Vision for 2020 and Beyond", 3GPP RAN Workshop on 5G, RWS-150051, Sep. 3, 2015, Phoenix, AZ, USA, pp. 1-23.

* cited by examiner

FLEXIBLE TRANSMISSION UNIT AND ACKNOWLEDGMENT FEEDBACK TIMELINE FOR EFFICIENT LOW LATENCY COMMUNICATION

CROSS-REFERENCE TO RELATED APPLICATIONS

This application claims priority to U.S. Provisional Application Ser. No. 62/265,944, entitled "FLEXIBLE TRANSMISSION UNIT AND ACKNOWLEDGMENT FEEDBACK TIMELINE FOR EFFICIENT LOW LATENCY COMMUNICATION," filed Dec. 10, 2015, which is expressly incorporated by reference herein in its entirety.

INTRODUCTION

The present disclosure relates generally to wireless communications and, more specifically, to methods and apparatuses for separately acknowledging time division multiplexed (TDM) data units, in an effort to achieve low latency for each data unit.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (BSs) that can support communication for a number of user equipments (UEs). A UE may communicate with a base station (BS) via the downlink and uplink. The downlink (or forward link) refers to the communication link from the BS to the UE, and the uplink (or reverse link) refers to the communication link from the UE to the BS. A BS may transmit data and control information on the downlink to a UE and/or may receive data and control information on the uplink from the UE.

In an effort to support faster, more flexible time division duplexed (TDD) switching and turn around, as well as support for new deployment scenarios, self-contained TDD subframes may schedule information, data transmission, and acknowledgment in the same subframe (e.g., in a self-contained subframe).

SUMMARY

Certain aspects of the present disclosure provide a method for wireless communication. The method generally includes receiving, within a subframe a first portion of a downlink control region scheduling at least a first data unit, wherein the subframe comprises at least two transmission time intervals (TTIs) and wherein each subframe comprises the downlink control region, a data region, and an uplink control region, receiving the first data unit in a first TTI of the data region, receiving a second data unit in a second TTI of the data region, and separately acknowledging receipt of the first and second data units, wherein the first data unit is acknowledged in the uplink control region.

Certain aspects of the present disclosure provide a method for wireless communication. The method generally includes transmitting, within a subframe, a first portion of a downlink control region scheduling at least a first data unit to be transmitting in the subframe, wherein the subframe comprises at least two transmission time intervals (TTIs) and wherein each subframe comprises the downlink control region, a data region, and an uplink control region, transmitting the first data unit in a first TTI of the data region, transmitting a second data unit in a second TTI of the data region, and receiving separate acknowledgements for the first and second data units, wherein the first data unit is acknowledged in the uplink control region.

Certain aspects of the present disclosure provide an apparatus for wireless communication by a user equipment (UE). The apparatus generally includes means for receiving, within a subframe a first portion of a downlink control region scheduling at least a first data unit, wherein the subframe comprises at least two transmission time intervals (TTIs) and wherein each subframe comprises the downlink control region, a data region, and an uplink control region, means for receiving the first data unit in a first TTI of the data region, means for receiving a second data unit in a second TTI of the data region, and means for separately acknowledging receipt of the first and second data units, wherein the first data unit is acknowledged in the uplink control region.

Certain aspects of the present disclosure provide an apparatus for wireless communication by a base station (BS). The apparatus generally includes means for transmitting, within a subframe, a first portion of a downlink control region scheduling at least a first data unit to be transmitting in the subframe, wherein the subframe comprises at least two transmission time intervals (TTIs) and wherein each subframe comprises the downlink control region, a data region, and an uplink control region, means for transmitting the first data unit in a first TTI of the data region, means for transmitting a second data unit in a second TTI of the data region, and means for receiving separate acknowledgements for the first and second data units, wherein the first data unit is acknowledged in the uplink control region.

Certain aspects of the present disclosure provide an apparatus for wireless communication comprising a processor and a memory coupled to the at least one processor. The at least one processor is configured to receive, within a subframe a first portion of a downlink control region scheduling at least a first data unit, wherein the subframe comprises at least two transmission time intervals (TTIs) and wherein each subframe comprises the downlink control region, a data region, and an uplink control region, receive the first data unit in a first TTI of the data region, receive a second data unit in a second TTI of the data region, and separately acknowledge receipt of the first and second data units, wherein the first data unit is acknowledged in the uplink control region.

Certain aspects of the present disclosure provide an apparatus for wireless communication comprising a processor and a memory coupled to the at least one processor. The at least one processor is configured to transmit, within a subframe, a first portion of a downlink control region scheduling at least a first data unit to be transmitting in the subframe, wherein the subframe comprises at least two transmission time intervals (TTIs) and wherein each subframe comprises the downlink control region, a data region, and an uplink control region, transmit the first data unit in a first TTI of the data region, transmit a second data unit in a second TTI of the data region, and receive separate acknowledgements for the first and second data units, wherein the first data unit is acknowledged in the uplink control region.

Certain aspects of the present disclosure provide a computer readable medium for wireless communication having computer-executable instructions stored thereon for receiving, within a subframe a first portion of a downlink control region scheduling at least a first data unit, wherein the subframe comprises at least two transmission time intervals (TTIs) and wherein each subframe comprises the downlink control region, a data region, and an uplink control region, receiving the first data unit in a first TTI of the data region, receiving a second data unit in a second TTI of the data region, and separately acknowledging receipt of the first and second data units, wherein the first data unit is acknowledged in the uplink control region.

Certain aspects of the present disclosure provide a computer readable medium for wireless communication having computer-executable instructions stored thereon for transmitting, within a subframe, a first portion of a downlink control region scheduling at least a first data unit to be transmitting in the subframe, wherein the subframe comprises at least two transmission time intervals (TTIs) and wherein each subframe comprises the downlink control region, a data region, and an uplink control region, transmitting the first data unit in a first TTI of the data region, transmitting a second data unit in a second TTI of the data region, and receiving separate acknowledgements for the first and second data units, wherein the first data unit is acknowledged in the uplink control region.

Numerous other aspects are provided including apparatus, systems and computer program products. Various aspects and features of the disclosure are described in further detail below.

DETAILED DESCRIPTION

Figure 1:
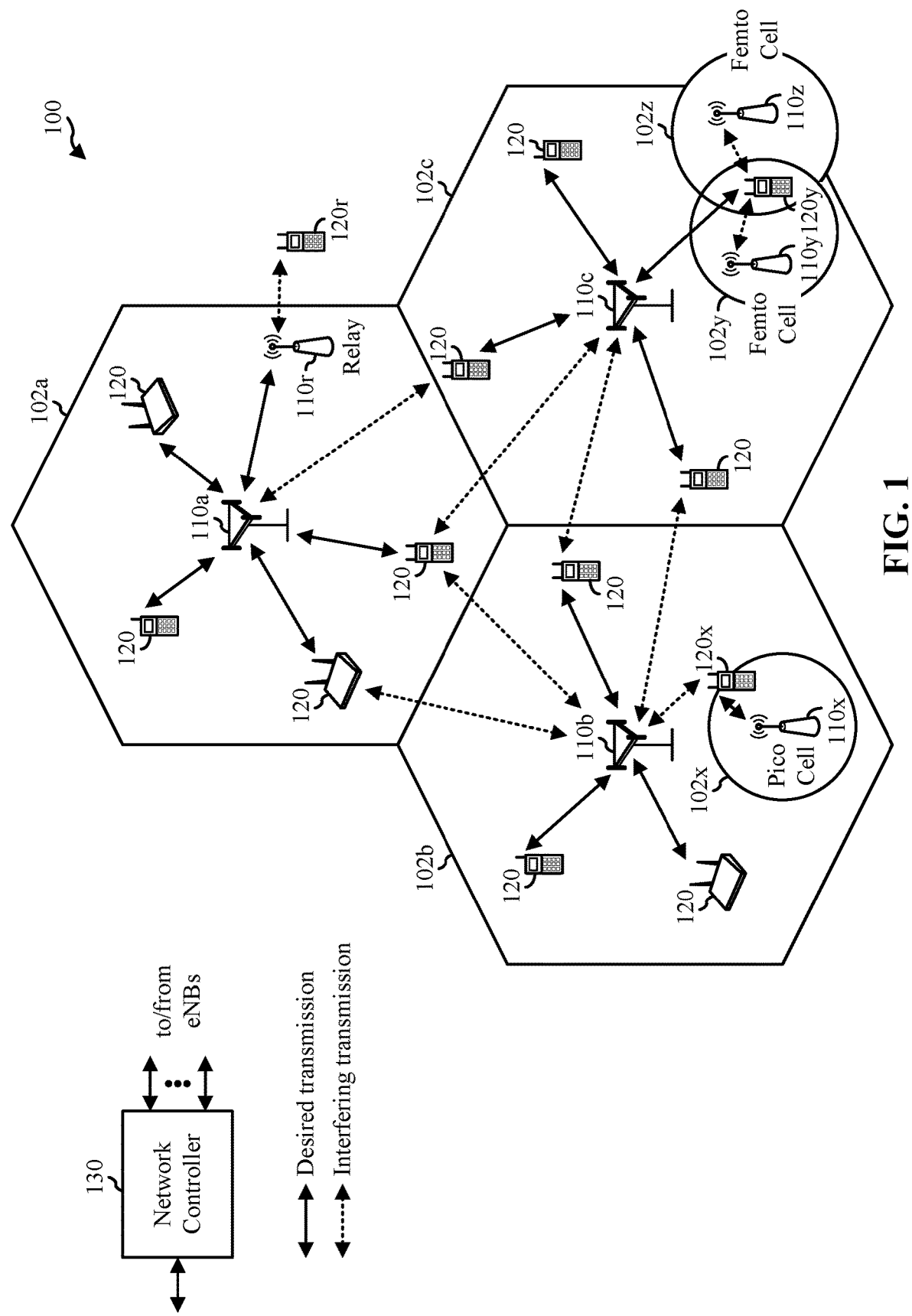
FIG. 1 is a block diagram conceptually illustrating an example of a wireless communications network in accordance with certain aspects of the present disclosure.

A TDD self-contained subframe may include UL/DL scheduling information, a data unit (which may be transmitted in a transmission time interval (TTI)), and an acknowledgement (ACK) for the data unit in the same subframe. For example, a BS may transmit a downlink control channel scheduling a downlink data transmission, transmit the downlink transmissions, and receive an acknowledgment/negative acknowledgment (ACK/NACK) within a same subframe.

The phrase self-contained subframe may refer to any unit of time in which UL/DL scheduling information related to a data unit, the data unit, and an acknowledgement (ACK) for the data unit are transmitted in the same unit of time. Thus, a self-contained subframe may be referred to as slot (e.g., self-contained slot), TTI (self-contained TTI), or any unit of time having DL control scheduling a data transmission, the data transmission, and an UL acknowledgement corresponding to the data transmission.

Aspects described herein provide methods and apparatuses for a UE to receive, within a subframe a first portion of a downlink control region scheduling at least a first data unit, wherein the subframe comprises at least two transmission time intervals (TTIs) and wherein each subframe comprises the downlink control region, a data region, and an uplink control region, receive the first data unit in a first TTI of the data region, receive a second data unit in a second TTI of the data region, and separately acknowledge receipt of the first and second data units.

The first data unit may be acknowledged in the same subframe as the first data unit. According to an example, the second data unit may be acknowledged in a same or different subframe as the second data unit.

Similarly, aspects described herein provide methods and apparatus for a BS to transmit, within a subframe, a first portion of a downlink control region scheduling at least a first data unit to be transmitting in the subframe, wherein the subframe comprises at least two transmission time intervals (TTIs) and wherein the subframe comprises the downlink control region, a data region, and an uplink control region, transmit the first data unit in a first TTI of the data region, transmit a second data unit in a second TTI of the data region, and receive separate acknowledgements for the first and second data units. The acknowledgement for the first data unit may be received in the uplink control region of the same subframe as the first data unit.

As described above, the acknowledgement for the second data unit may be received in the same or different subframe as the second data unit.

According to aspects, the first and second data units in the subframe correspond to a first and second hybrid automatic repeat request (HARQ) process, respectively. Further, as will be explained in more detail herein, the first and second data units may be acknowledged in a different uplink control regions of the same subframe or different control regions of different subframes. The aspects described herein allow a BS and UE to gain processing time while maintaining low latency (e.g., such that the radio interface may not be the bottleneck). For example, a data unit may be acknowledged faster according to the methods described herein. Accordingly, HARQ retransmissions may occur more quickly as well.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are newer releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

It is noted that while aspects may be described herein using terminology commonly associated with 3G and/or 4G wireless technologies, aspects of the present disclosure can be applied in other generation-based communication systems and/or emerging telecommunication standards.

An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

FIG. 1 shows a wireless communication network 100 (e.g., an LTE network), in which the techniques described herein may be practiced. The techniques may be utilized for communications between UEs 120 and BSs 110. The illustrated UEs and BSs may communicate using a self-contained TDD subframe in which a UE both receives first and second data units in a subframe and separately transmits acknowledgements for each of the first and second data units. The acknowledgement for at least the first data unit is transmitted in the same subframe as the first data unit.

As illustrated, the wireless network 100 may include a number of evolved Node Bs (eNBs) 110 (as used herein, an eNB may be referred to as a base station (BS)), and other network entities. An eNB may be a station that communicates with user equipment devices and may also be referred to as a BS, a Node B, an access point (AP), etc. Each eNB 110 may provide communication coverage for a particular geographic area. The term "cell" may refer to a coverage area of an eNB and/or an eNB subsystem serving this coverage area, depending on the context in which the term is used.

In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop computer, a netbook, a smartbook, an ultrabook, a cordless phone, a wireless local loop (WLL) station, a tablet, a position location device, a gaming device, a camera, a wearable device (e.g., smart glasses, smart goggles, smart bracelet, smart watch, smart band, smart ring, smart clothing), a drone, a robot, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

A UE may be within the coverage of multiple eNBs. One of these eNBs may be selected to serve the UE. The serving eNB may be selected, for example, based on various criteria such as received power, received quality, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (e.g., and not based on the transmit power level of the eNB).

Figure 2:
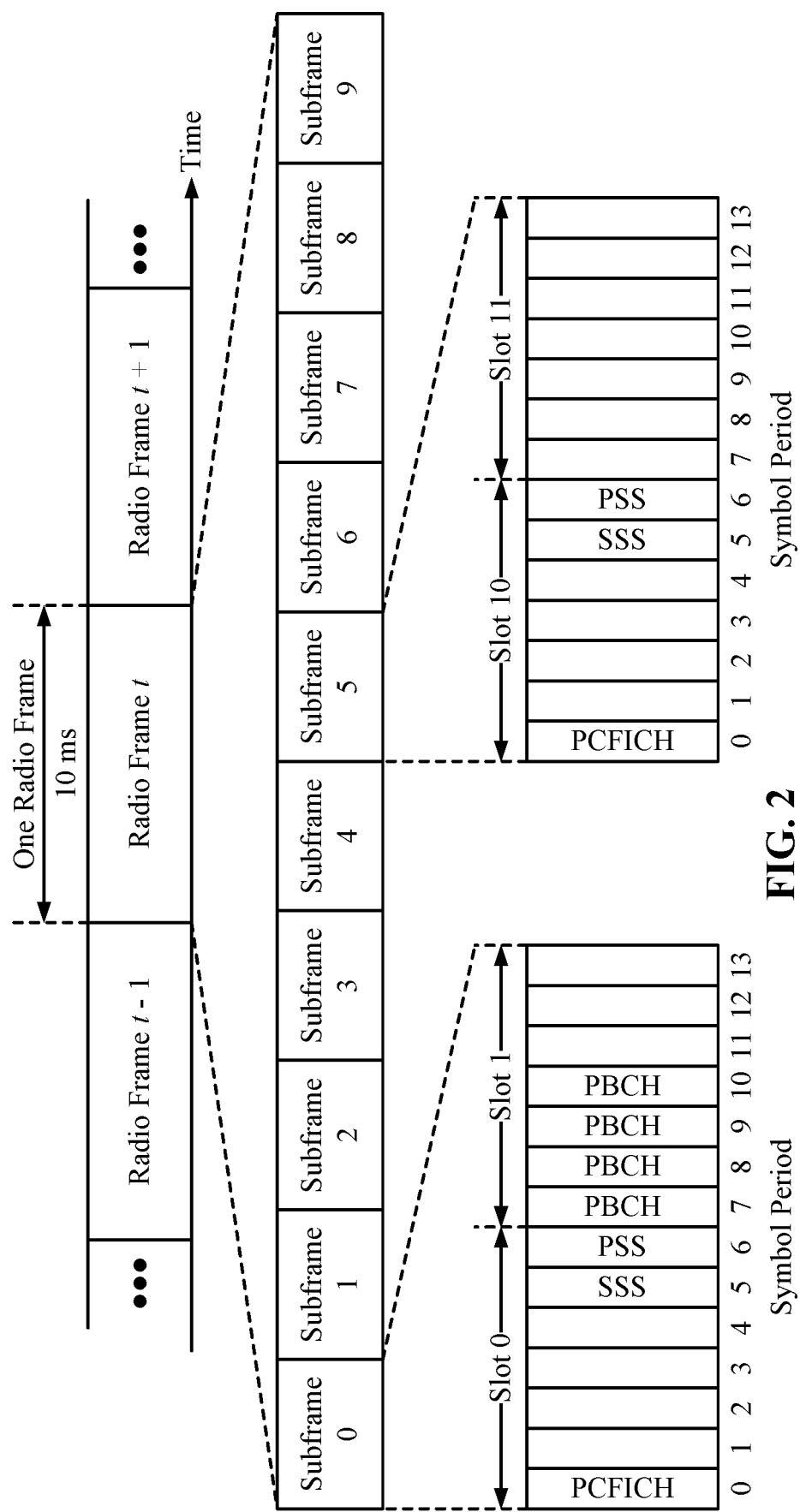
FIG. 2 is a block diagram conceptually illustrating an example of a frame structure in a wireless communications network in accordance with certain aspects of the present disclosure.

FIG. 2 shows a frame structure used in LTE. For example, eNB 110 may communicate on the downlink (DL) using the illustrated frame structure.

The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
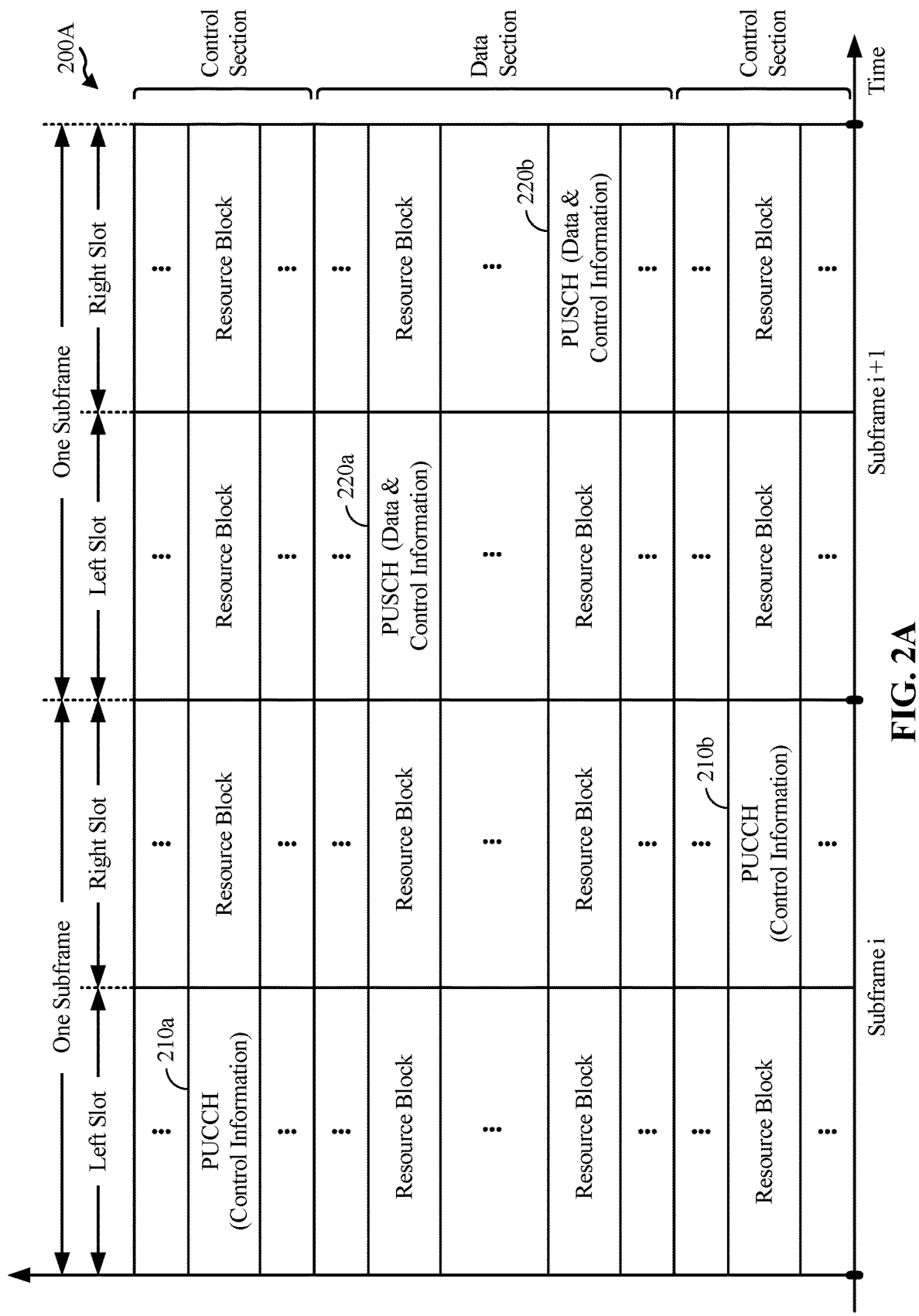
FIG. 2A shows an example format for the uplink in Long Term Evolution (LTE) in accordance with certain aspects of the present disclosure.

FIG. 2A shows an exemplary format 200A for the uplink in LTE. As described herein, an eNB may assign groups of uplink resources to groups of one or more UEs for contention-based access within an uplink subframe. The eNB may decode uplink transmissions received from the UEs in the subframe based, at least in part, on the assigned group of resources.

The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

Figure 3:
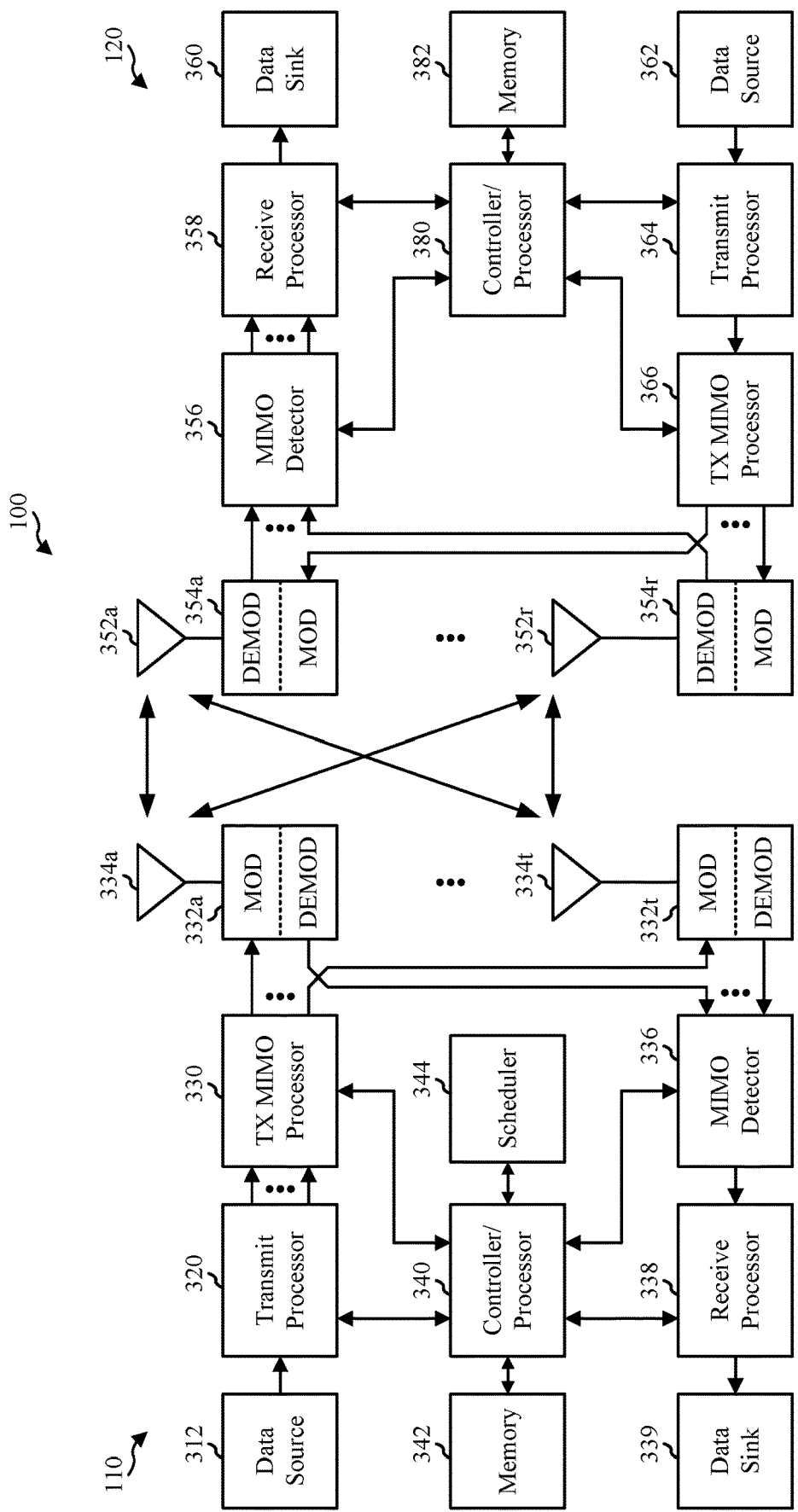
FIG. 3 shows a block diagram conceptually illustrating an example of an eNB in communication with a UE in a wireless communications network in accordance with certain aspects of the present disclosure.

FIG. 3 illustrates a block diagram of a design of a BS/eNB 110 and a UE 120 in the wireless communication network 100. In certain aspects, the BS/eNB 110 may be one of the BSs/eNBs illustrated in FIG. 1 and the UE 120 may be one of the UEs illustrated in FIG. 1. The BSs/eNBs and UEs described herein may include one or more modules as shown in FIG. 3. The BS/eNB 110 may be configured to perform the operations described herein, and as detailed in FIG. 5 and the UE 120 may be configured to perform the operations described herein and as detailed in FIG. 4.

For a restricted association scenario, the eNB 110 may be macro eNB 110c in FIG. 1, and UE 120 may be UE 120y in FIG. 1. The eNB 110 may also be a BS of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controller/processor 340, 380 may direct the operation at the eNB 110 and the UE 120, respectively. For example, the controller/processor 340 and/or other processors and modules at the BS/eNB 110 may perform or direct operations described below with reference to FIGS. 4 and 5 and/or other processes for the techniques described herein. The memory 342 may store data and program codes for the eNB 110. The memory 382 may store data and program codes for the UE 120.

One or more modules at the UE 120 may be configured to performed the operations described herein. For example, one or more of the antenna 352, demod/mod 354, receive processor 358, and controller/processor 380 may be configured to receive as described herein. For example, one or more of these components may be configured to perform the means for receiving, within a subframe a first portion of a downlink control region scheduling at least a first data unit, wherein the subframe comprises at least two transmission time intervals (TTIs), means for receiving the first data unit in a first TTI of the data region, and means for receiving a second data unit in a second TTI of the data region. One or more of the controller/processor 380, transmit processor 364, demod/mod 354 and antenna 352 may be configured to perform the means for separately acknowledging receipt of data units and perform the means for transmitting operations as described herein.

One or more modules at the BS 110 may be configured to perform the operations described herein. For example, one or more of the transmit processor 320, controller/processor 340, mod/demod 332, antenna 334, and controller/processor 340 may be configured to transmit as described herein. For example, one or more of these components may be configured to perform the means for transmitting, within a subframe, a first portion of a downlink control region scheduling at least a first data unit to be transmitted in the subframe, means for transmitting the first data unit in a first TTI of the data region, and means for transmitting a second data unit in a second TTI of the data region. One or more of the controller/processor 340, receive processor 338, mod/demod 332, and antenna 334 may be configured to receive as described herein. For example, one or more of these components may be configured perform the means for receiving separate acknowledgements for the first and second data units, wherein the first data unit is acknowledged in the uplink control region.

A scheduler 344 may schedule and/or assign groups of resources, within an uplink subframe to different groups of one or more UEs. One or more antennas 334 and demodulators/modulators 332 may decode received UL transmissions from the UEs, based at least in part on the assigned group of resources, receive a buffer status report (BSR) in an uplink transmission from at least one of the UEs, and/or transmit an UL grant.

According to certain aspects, a UE or eNB may support a low latency ("LL" or ultra low latency "ULL") capability. As used herein, the term ultra low latency capability generally refers to the capability to perform certain procedures with low latency relative to devices that lack the capability (e.g., so called "legacy" devices). In one implementation, the ULL capability may refer to the ability to support transmission time interval (TTI) periods around 0.1 ms or less (e.g., 20 µs) (with 0.1 ms or 20 µs corresponding to a conventional LTE subframe duration). However, it should be noted that, in other implementations, the ULL capability may refer to other low latency periods. Some examples of TTI considered for LL or ULL include: TTI spanning one slot (½ of a subframe), TTI spanning one symbol ($1/14^{th}$ of a subframe), or TTI spanning $1/10^{th}$ of a subframe.

Flexible Transmission Unit and ACK Feedback Timeline

As described above, a TDD self-contained subframe structure includes UL/DL scheduling information, data, and acknowledgement regarding the data in the same subframe (and/or acknowledgements of data received by a UE in one or more previous subframes). Thus, a self-contained subframe may allow both UL and DL communication without needing any further information from another subframe. In an effort to achieve increased processing time at a UE and BS, while maintaining low latency, aspects described herein provide a flexible transmission unit wherein, within a same subframe, multiple data units are transmitted and acknowledgments for the data units are separately received in a same or different subframe. For example, a first data unit may be scheduled, transmitted and acknowledged in a same subframe. Further, a second data unit may be scheduled and transmitted in the same subframe as the first data unit. The acknowledgement for the second data unit may be transmitted in a same or different subframe (as the second data unit and acknowledgement of the first data unit).

Accordingly, a BS may transmit a first and second data unit in a same subframe. The BS may receive separate acknowledgments from the UE for each of the data units. The BS may receive an acknowledgement for a first data unit in a same subframe as the first data unit. The BS may receive an acknowledgement for a second data unit in the same or different subframe as the second data unit. Similarly, a UE may receive the first and second data units in a same subframe. The UE may separately transmit an acknowledgment to the BS for the first data unit and the second data unit. The acknowledgement for the first data unit may be transmitted in a same subframe as the first data unit. The acknowledgement for the second data unit may be transmitted in a same or different subframe (as the second data unit and acknowledgement of the first data unit).

According to aspects, a self-contained subframe may have at least two transmission time intervals (TTIs). A data region may include one or more TTIs for the transmission of a data unit. Data units may be transmitted in a respective TTI within the data region. As described herein, one data unit may be transmitted in a TTI. The self-contained subframe may contain a downlink control region, a data region, and an uplink control region. The data portion may include multiple TTIs. Data units received by the UE may be separately acknowledged in the uplink control region of the same subframe and/or a later subframe.

As will be described in more detail herein, a first data unit may be transmitted by a BS in a first TTI of a data region of a subframe and may be acknowledged by the UE in the same subframe. Further, a second data unit may be transmitted by the BS in a second TTI of the data region of the same subframe. The second data unit may be separately acknowledged in a different (e.g., later, second) uplink control region of the same subframe or in a subsequent subframe.

Figure 4:
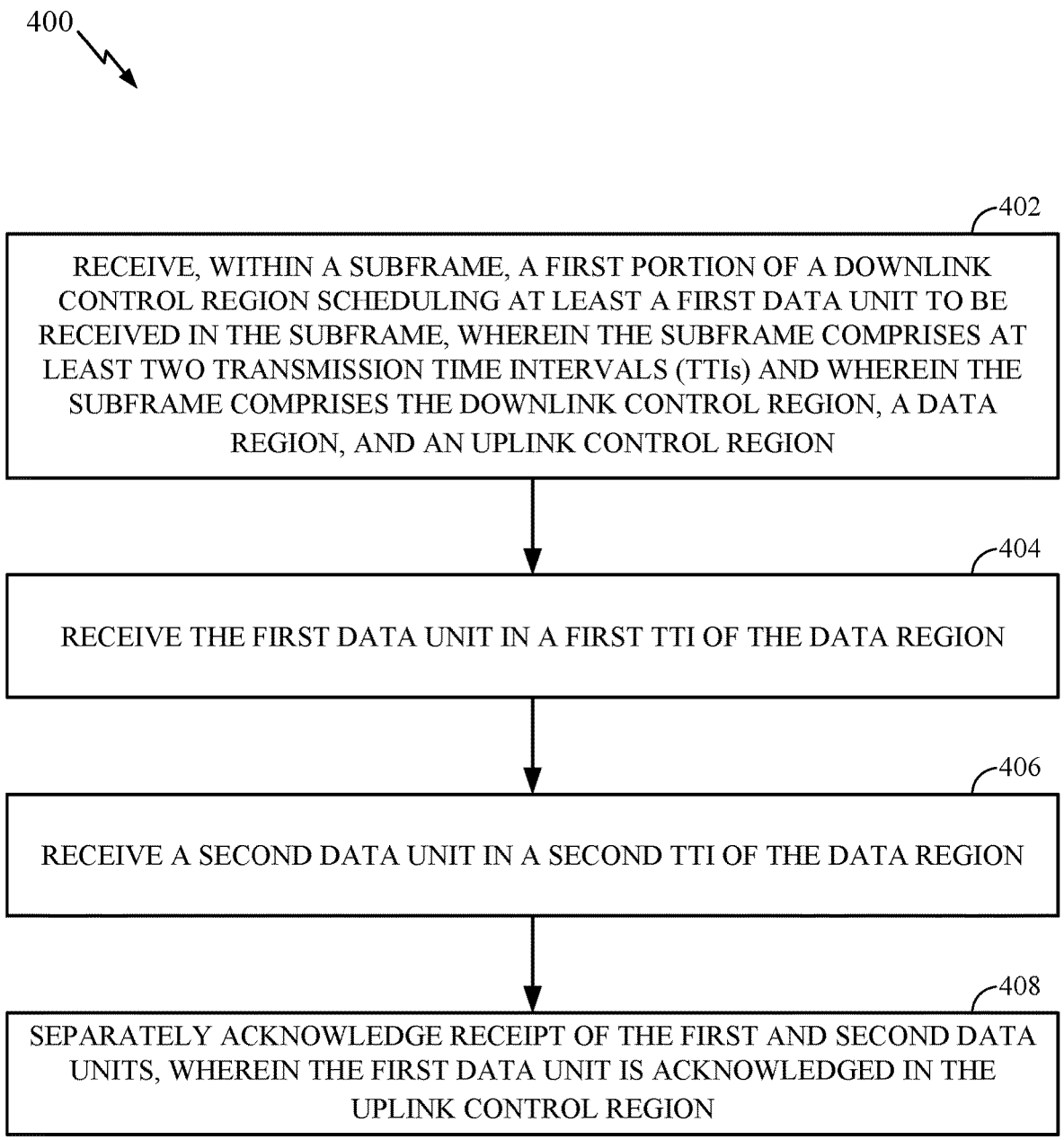
FIG. 4 illustrates example operations performed, for example, by a UE, according to aspects of the present disclosure.

FIG. 4 illustrates example operations 400, performed, for example, by a UE in accordance with aspects of the present disclosure. The UE may be UE 120 as illustrated in FIG. 1 having one or more components as illustrated in FIG. 3.

At 402, a UE may receive, within a subframe, a first portion of a downlink control region scheduling at least a first data unit to be received in the subframe, wherein the subframe comprises at least two TTIs and wherein the subframe comprises the downlink control region, a data region, and an uplink control region for control and data transmissions of the corresponding TTIs. At 404, the UE may receive the first data unit in a first TTI of the data region. At 406, the UE may receive a second data unit in a second TTI of the data region. At 408, the UE may separately acknowledge receipt of the first and second data units, wherein the first data unit is acknowledged in the uplink control region. As described herein, the first and second data units may be acknowledged in uplink control regions of a same or different subframe as the first and second data unit, respectively.

Figure 5:
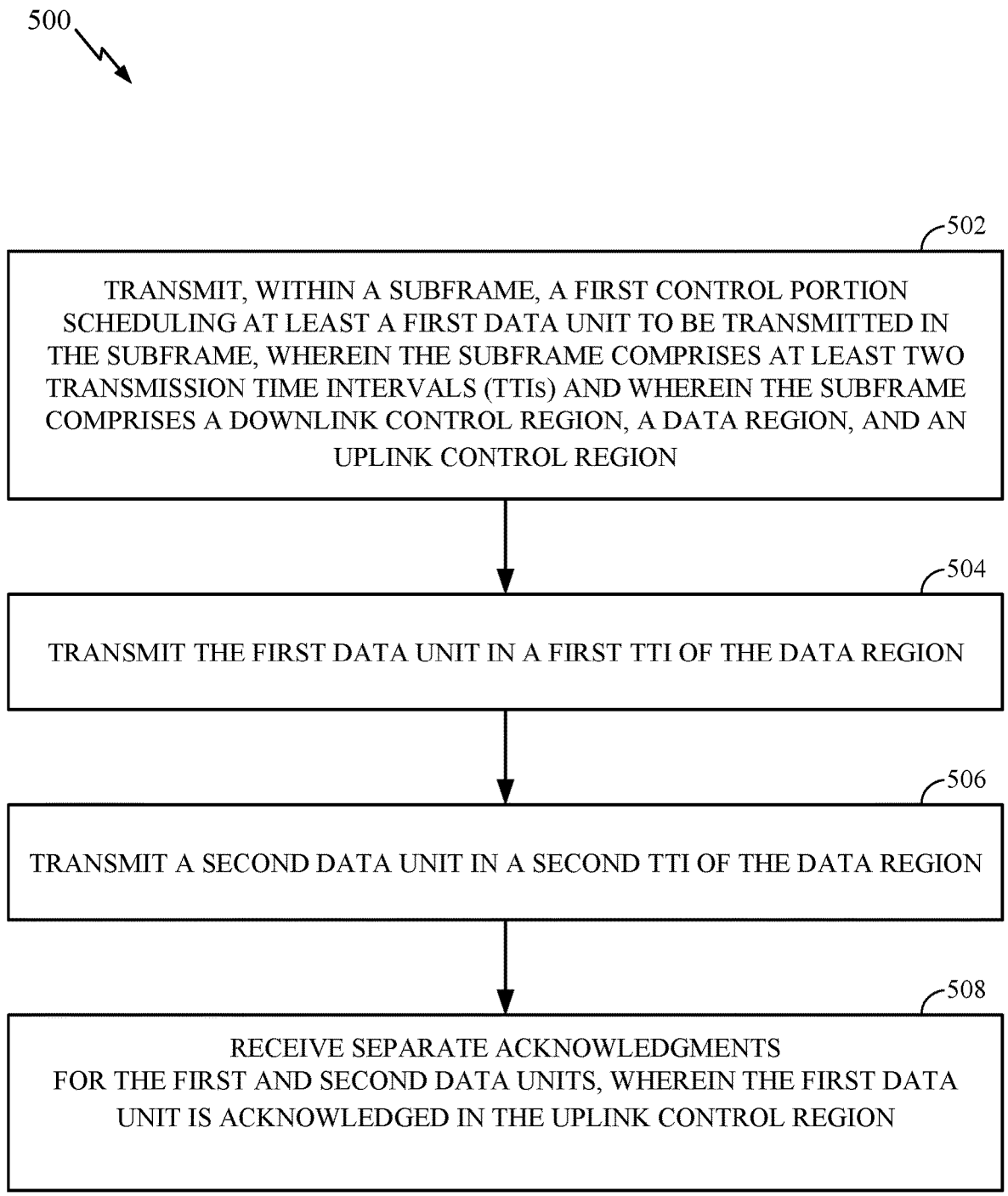
FIG. 5 illustrates example operations performed, for example, by a BS, according to aspects of the present disclosure.

FIG. 5 illustrates example operations 500 performed, for example, by a BS, in accordance with aspects of the present disclosure. The BS may be BS 110 as illustrated in FIG. 1 having one or more components as illustrated in FIG. 3.

At 502, the BS may transmit, within a subframe, a first control portion, of a downlink control region, scheduling at least a first data unit to be transmitted in the subframe, wherein the subframe comprises at least two TTIs and wherein the subframe comprises the downlink control region, a data region, and an uplink control region. At 504, the BS may transmit the first data unit in a first TTI of the data region. At 506, the BS may transmit a second data unit in a second TTI of the data region. At 508, the BS may receive separate acknowledgments for the first and second data units, wherein the first data unit is acknowledged in the uplink control region (of the subframe in which the first data unit was transmitted).

Figure 6:
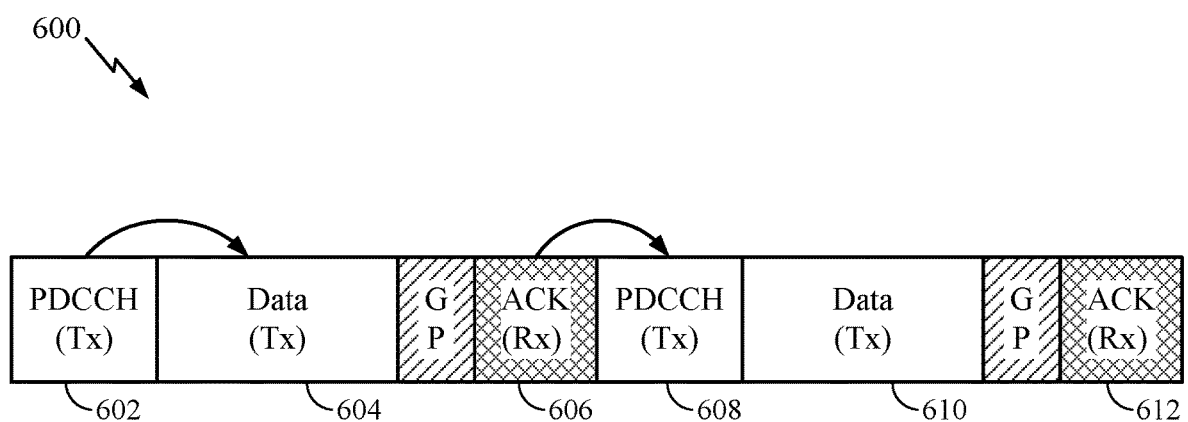
FIG. 6 illustrates an example self-contained subframe structure which achieves low latency, according to aspects of the present disclosure.

FIG. 6 illustrates an example self-contained subframe structure 600, in accordance with aspects of the present disclosure. For illustrative purposes, FIG. 6 illustrates an example transmitter-scheduled subframe 600 or a DL centric subframe 600. As described herein the subframe 600 may be used to carry control and data to one or more UEs. Further, the subframe may be used to receive acknowledgment information from the one or more UEs within the same subframe. As illustrated, two data units 604, 610 are transmitted in the subframe 600. One data unit may be transmitted in a respective TTI. Each TTI in FIG. 6 may be, for example, 0.5 ms long.

From the perspective of a BS, control information (e.g., PDCCH) 602 scheduling a data transmission and the data 604 may be transmitted. Therefore, the BS may first transmit control/scheduling information in the control portion 602 and then transmit data in the DL data portion (data region) 604. Following a guard period (GP), where the BS switches from a transmission mode to a reception mode and where the UE switches from a reception mode to a transmission mode, the data transmitted in the DL data portion 604 may be acknowledged at 606 by a UE within the same subframe 600.

Following the acknowledgment 606, the control information 608 may schedule another data transmission 610. In this manner, the back-to-back scheduling allows for data 604, acknowledgment 606, and new transmission/new scheduling 608 in the subframe 600. As illustrated, downlink control transmissions 602, 608, data processes 604, 610 and the acknowledgments 606, 612 for the data processes may all occur in the self-contained subframe 600.

In this example, the scheduling delay may be 0.5 ms, the TTI (604, 610) may be 0.5 ms, and the HARQ round trip time (RTT) (the turnaround for every retransmission) may be 0.5 ms. The TTI may equal the HARQ RTT. Accordingly, the latency for a data unit may be (0.5 ms scheduling delay+0.5 ms TTI)+0.5 N_HARQ, where N_HARQ is the number of HARQ retransmissions for the data unit.

Figure 7:
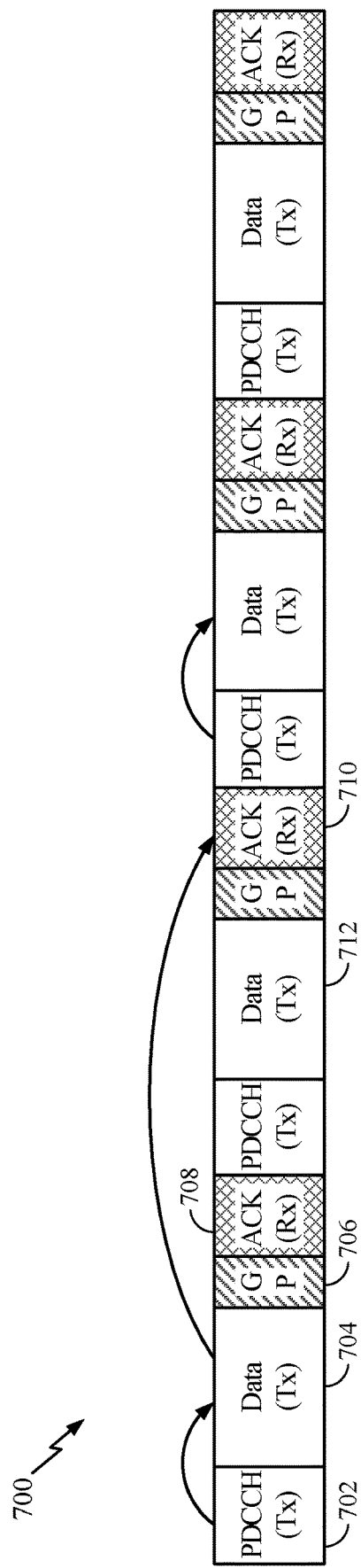
FIG. 7 illustrates an example of a shortened self-contained subframe structure with two data processes (e.g., interlaces) for increased processing time, according to aspects of the present disclosure.

FIG. 7 illustrates an example self-contained subframe 700 with two interlaces. An interlace may represent a data transmission/data unit. Each data unit is transmitted in a TTI and each data unit has its own HARQ process. Two interlaces in a self-contained subframe allow for increased processing time by the UE and BS. FIG. 7 illustrates a two-interlace structure because, as described below, a first and second data unit are both transmitted before an acknowledgement for the first data unit occurs. For example, as illustrated in FIG. 7, data 704 is acknowledged in a subsequent data processing unit (wherein a data processing unit comprises a DL control, data transmission and UL acknowledgment) of the subframe, which occurs after the transmission of data 712. Accordingly two data units (704 and 712), or two HARQ processes, are interlaced.

According to FIG. 7, the control transmission 702 may schedule DL data 704 for a first TTI. Following a GP 706, and transmission of a second data unit 712, the data may be acknowledged at 710 in a second uplink control region (or second data processing unit) of the subframe, as opposed to the first uplink control region 708. According to aspects, data unit 704 may correspond to a first interlace (e.g., HARQ process), and data unit 712 may correspond to a second interlace.

In this example, the scheduling delay may be 0.25 ms, the TTI may be 0.25 ms, and the HARQ RTT may be 0.5 ms. Accordingly, the latency for a data unit may be 0.5 ms+0.5 N_HARQ, where N_HARQ is the number of HARQ retransmissions for a data unit.

FIG. 7, relative to FIG. 6, includes additional pilot/control (e.g., PDCCH (Tx)), GP, and uplink acknowledgment (ACK) overhead.

Figure 8:
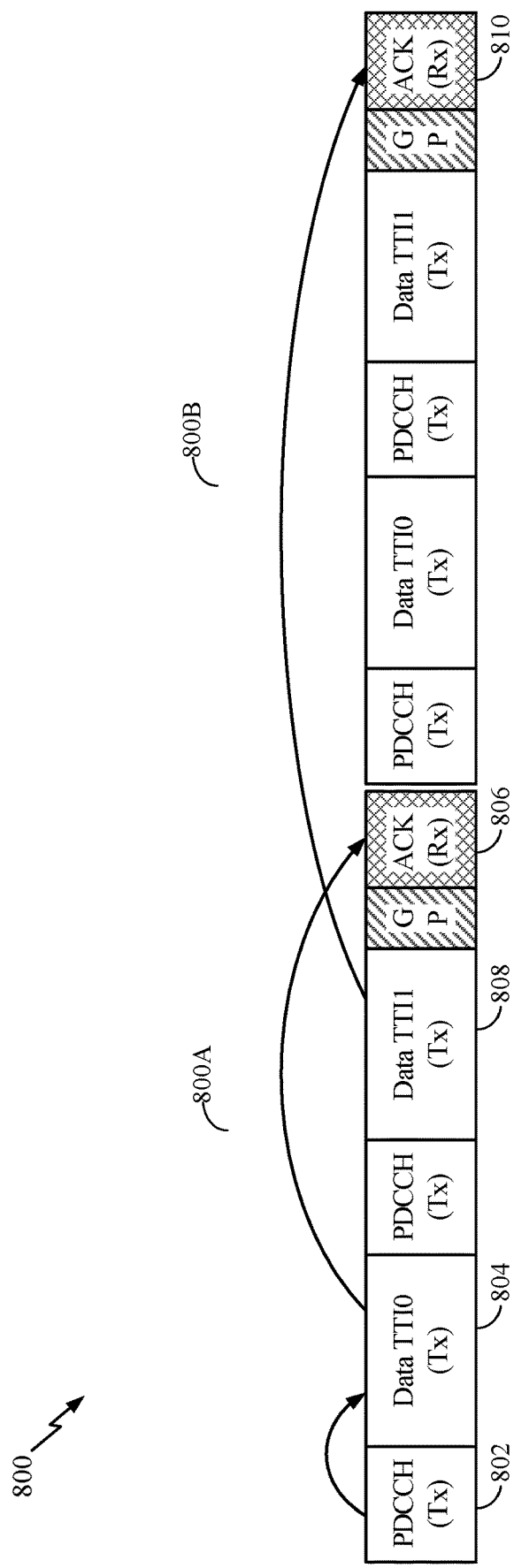
FIG. 8 illustrates an example of a flexible unit of transmission, according to aspects of the present disclosure.

FIG. 8 illustrates an example of a flexible unit of transmission 800, with a shortened TTI and two interlace structure for increased processing time by the UE and BS, in accordance with aspects of the present disclosure. Relative to FIG. 6, FIG. 8 illustrates a scaled down TTI (of 0.25 ms), with a two interlace structure, the same GP and ACK overhead, and a high pilot/control (e.g., PDCCH) overhead. Further, relative to FIG. 7, FIG. 8 has a decreased GP and ACK overhead.

The PDCCH 802 may schedule a first interlace (HARQ process) 804 in a TTI of a slot, where a slot may represent a portion of the subframe 800A. A second interlace 808 may be transmitted in a second TTI of a second slot of the subframe 800A. The transmitted data of the first interlace 804 may be acknowledge at 806. With respect to data transmission 804, the subframe 800A is a self-contained subframe. The transmitted data of the second interlace 808 may be acknowledged in an uplink control region 810 of the subframe 800B.

By shortening the TTI as illustrated in FIG. 8, the data transmission 804 occurs early enough in subframe 800A, that it may be acknowledged in the same subframe. Data transmission 808, however, may be acknowledged in a subsequent subframe 800B.

In this example, the latency for a data unit transmitted in TTI1 may be based on a scheduling delay of 0.25 ms, TTI of 0.25 ms, and a HARQ RTT of 0.75 ms. While a two interlace structure is illustrated, a three-interlace structure may include a 0.75 ms RTT and a delay of 0.5+0.75 N_HARQ where N_HARQ is the number of HARQ retransmissions for a data unit. For asynchronous scheduling, the latency may be 0.5 ms +0.75 ms for N_HARQ==1, 0.5 ms+0.75 ms+0.5 for N_HARQ==2, and 0.5 ms+0.75 ms+0.5 ms+0.75 ms for N_HARQ==3. As described above, the subframe structure illustrated in FIG. 8 may have a high pilot/control (e.g., PDCCH) overhead.

Figure 9:
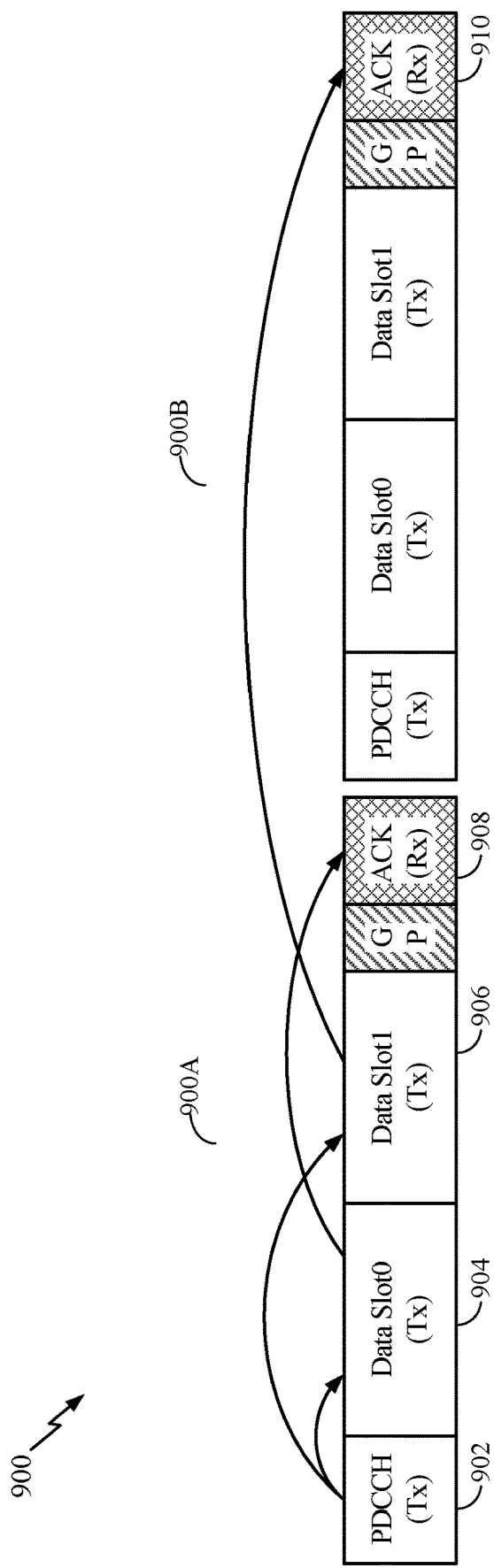
FIG. 9 illustrates an example of a flexible unit of transmission, according to aspects of the present disclosure.

FIG. 9 illustrates an example of a flexible unit of transmission 900 with two interlaces for increased processing time, in accordance with aspects of the present disclosure. According to this example, the TTI may have a duration of 0.25 ms. The PDCCH 902 may schedule multiple interlaces for transmission in the subframe 900A.

For example, the PDCCH 902 may schedule a data unit for a first and second TTI. As illustrated, the PDCCH 902 may schedule a first data unit to be transmitted at 904, and a second data unit to be transmitted at 906. The first and second data units may be transmitted in different slots of the subframe 900A. The subframe structure 900A has a same GP and ACK overhead as compared the baseline self-contained subframe structure illustrated in FIG. 6.

In FIG. 9, the scheduling 902, data transmission 904, data processing, and acknowledgment 908 for the data for the first interlace 904 may occur in the subframe 900A. Data for the second data process 906 may be acknowledged in a next subframe 900B at 910. Accordingly, low-latency data may be scheduled in in the first TTI (e.g., 904), as opposed to a second TTI (e.g., 906).

According to FIG. 9, the scheduling delay may be 0.5 ms, the subframe duration may be 0.5 ms, data slot/TTI may be 0.25 ms, and HARQ RTT may be 0.75 ms.

While not illustrated, FIG. 9 may be extended to a three interlace structure. Each subframe may have two TTIs, wherein an interlace is transmitted in each TTI. For example, Interlace 0 and Interlace 1 may be respectively transmitted in TTI0 and TTI1 of subframe 0. Interlace 0 and Interlace 2 may be respectively transmitted in TTI0 and TTI1 of subframe 1. Interlace 0 and Interlace 1 may be respectively transmitted in TTI0 and TTI1 of subframe 2. Interlace 0 may have low latency, as it may be acknowledged in a same subframe as the data transmission for Interlace 0. Accordingly, retransmissions, if necessary, for Interlace 0 may occur in a next subframe.

Figure 10:
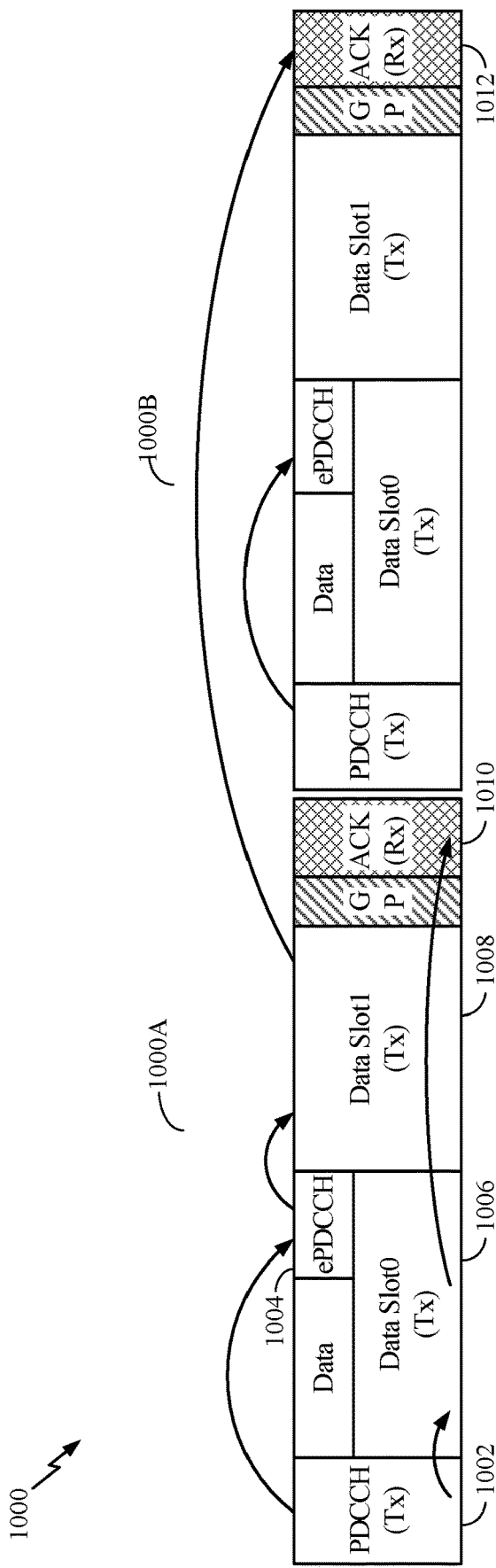
FIG. 10 illustrates an example of a flexible unit of transmission, according to aspects of the present disclosure.

FIG. 10 illustrates an example of a flexible unit of transmission 1000, with two interlaces for increased processing time, in accordance with aspects of the present disclosure.

As illustrated a control region, (e.g., PDCCH) 1002 may schedule data for a first interlace 1006 in a first TTI of the subframe 1000 and may also transmit a dynamic indication of an additional control region (e.g., ePDCCH) 1004. The additional control region 1004 may schedule data for a second interlace 1008 in a second TTI of the subframe 1000A. Each of the TTIs may be transmitted in a respective slot of the subframe 1000A.

Data 1006 may be acknowledged in the same subframe 1000A as the data transmission, at 1010. Data for the second interlace 1008 may be acknowledged in a next uplink control region 1012 of a next subframe 1000B. Accordingly, low latency data may be scheduled at for the first TTI (e.g., 1006), depending on the scheduling delay. According to FIG. 10, the scheduling delay may be 0.25 ms, subframe may be 0.5 ms, data slot/TTI may be 0.25 ms, and HARQ RTT may be 0.75 ms, if not self-contained.

As described above, while not illustrated, the structure of FIG. 10 may be extended to include three interlaces, as described above.

Aspects described herein allow for an increase in processing time by a UE and BS while maintaining low latency for each data unit. This may be achieved by separately acknowledging each data unit as described herein. While FIGS. 6-10 are illustrated from the perspective of a BS, aspects described cover corresponding operations performed by a UE. For example, a UE may transmit the control information and data transmitted in a subframe. Further, the BS may separately transmit an acknowledgment for each data unit. An acknowledgement may be transmitted in a same subframe as the data transmission or in a subsequent subframe as the data transmission. Accordingly, a similar two TTI structure can be applied to UL centric subframes, where 2 data units are scheduled in the control at the beginning of the subframe and the data units are separately acknowledged by a BS.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor (e.g., controller/processor 340, transmit processor 320, transmit MIMO processor 330, receive processor 338, modulator/demodulator 332, antenna 334, controller/processor 380, transmit processor 364, transmit MIMO processor 366, MIMO detector 356, receive processor 358, modulator/demodulator 354, antenna 352).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, software/firmware, or combinations of both. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, phase change memory (PCM), ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, flash memory, PCM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communication, comprising:
   receiving a downlink control region in a subframe, wherein the subframe further comprises a data region and an uplink control region, and the data region comprises at least a first transmission time interval (TTI) and a second TTI;
   receiving a first data unit in the first TTI of the data region;
   receiving a second data unit in the second TTI of the data region;
   transmitting an acknowledgment or negative acknowledgment (ACK/NACK) for the second data unit scheduled by the downlink control region, in a subsequent subframe; and
   transmitting another ACK/NACK for the first data unit in the subframe.

2. The method of claim 1, wherein the first and second data units in the subframe correspond to a first and second hybrid automatic repeat request (HARQ) process, respectively.

3. The method of claim 1, wherein the first data unit is scheduled by another downlink control region of the subframe.

4. The method of claim 1, further comprising:
   receiving, in a first portion of the downlink control region, an indication of a second portion of the downlink control region.

5. The method of claim 4, wherein the second portion of the downlink control region schedules the second data unit.

6. A method for wireless communication, comprising:
   transmitting a downlink control region in a subframe, wherein the subframe further comprises a data region and an uplink control region, and wherein the data region comprises at least a first transmission time interval (TTI) and a second TTI;
   receiving a first data unit in the first TTI of the data region;
   receiving a second data unit in the second TTI of the data region;
   transmitting an acknowledgment or negative acknowledgment (ACK/NACK) for the second data unit scheduled by the downlink control region, in a subsequent subframe; and
   transmitting another ACK/NACK for the first data unit in the subframe.

7. The method of claim 6, wherein the first and second data units in the subframe correspond to a first and second hybrid automatic repeat request (HARQ) process, respectively.

8. The method of claim 6, further comprising:
   scheduling the first data unit by another downlink control region of the subframe.

9. The method of claim 6, further comprising:
   transmitting, in a first portion of the downlink control region, an indication of a second portion of the downlink control region.

10. The method of claim 9, wherein the second portion of the downlink control region schedules the second data unit.

11. An apparatus for wireless communication, comprising:
    memory; and
    one or more processors coupled to the memory and, individually or collectively, configured to:
       receive a downlink control region in a subframe, wherein the subframe further comprises a data region and an uplink control region, and wherein the data region comprises at least a first transmission time interval (TTI) and a second TTI;

receive a first data unit in the first TTI of the data region;

receive a second data unit in the second TTI of the data region; and transmit an acknowledgment or negative acknowledgment (ACK/NACK) for the second data unit scheduled by the downlink control region, in a subsequent subframe; and transmit another ACK/NACK for the first data unit in the subframe.

12. The apparatus of claim 11, wherein the first and second data units in the subframe correspond to a first and second hybrid automatic repeat request (HARQ) process, respectively.

13. The apparatus of claim 11, wherein the first data unit is scheduled by a second downlink control region.

14. The apparatus of claim 11, the one or more processors, individually or collectively, further configured to:

receive, in a first portion of the downlink control region, an indication of a second portion of the downlink control region.

15. The apparatus of claim 14, wherein the second portion of the downlink control region schedules the second data unit.

16. An apparatus for wireless communication, comprising:

memory; and one or more processors coupled to the memory and, individually or collectively, configured to:

transmit a downlink control region in a subframe, wherein the subframe further comprises a data region and an uplink control region, wherein the data region comprises at least a first transmission time interval (TTI) and a second TTI;

receive a first data unit in the first TTI of the data region;

receive a second data unit in the second TTI of the data region; and transmit an acknowledgment or negative acknowledgment (ACK/NACK) for the second data unit; scheduled by the downlink control region, in a subsequent subframe; and transmit another ACK/NACK for the first data unit in the subframe.

17. The apparatus of claim 16, wherein the first and second data units in the subframe correspond to a first and second hybrid automatic repeat request (HARQ) process, respectively.

18. The apparatus of claim 16, the one or more processors, individually or collectively, further configured to:

schedule the second data unit by another downlink control region.

19. The apparatus of claim 16, the one or more processors, individually or collectively, further configured to:

transmit, in a first portion of the downlink control region, an indication of a second portion of the downlink control region.

20. The apparatus of claim 19, wherein the second portion of the downlink control region schedules the second data unit.

21. The apparatus of claim 18, the subframe further comprising the other downlink control region.

* * * * *